United States Patent

[11] 3,589,751

[72] Inventor Serge Esnaud
 Paris, France
[21] Appl. No. 738,888
[22] Filed June 21, 1968
[45] Patented June 29, 1971
[73] Assignee CSF-Compagnie Generale De Telegraphie Sans Fil
[32] Priority June 29, 1967
[33] France
[31] 112499

[54] CERAMIC-TO-METAL SEAL
 6 Claims, 5 Drawing Figs.
[52] U.S. Cl. ................................................ 285/238,
 285/187, 285/332, 285/381, 287/189.365, 65/49,
 65/59, 65/154, 117/93.1, 117/105.2, 117/69,
 117/22
[51] Int. Cl. ...................................................... F16l 49/00,
 B05b 7/20
[50] Field of Search ............................................ 117/105.2,
 93.1, 22, 69; 65/49, 59, 154; 285/238, 381, 157,
 423, 332; 287/189.365

[56] References Cited
UNITED STATES PATENTS

| | | | |
|---|---|---|---|
| 1,184,813 | 5/1916 | Birdsall | 287/189.365 |
| 2,005,897 | 6/1935 | Knowles | 287/189.365 |
| 3,020,182 | 2/1962 | Daniels | 117/105.5 X |
| 3,075,066 | 1/1963 | Yenni et al. | 117/93.1 UX |
| 3,112,539 | 12/1963 | Barker | 117/93.1 UX |
| 3,191,288 | 6/1965 | George | 287/189.365 X |

FOREIGN PATENTS

| | | | |
|---|---|---|---|
| 1,378,658 | 10/1964 | France | 65/59 |
| 1,088,199 | 9/1960 | Germany | 285/187 |
| 1,107,748 | 4/1959 | Germany | 65/59 |

Primary Examiner—Alfred L. Leavitt
Assistant Examiner—J. H. Newsome
Attorney—Cushman, Darby & Cushman ABSTRACT: A method for reinforcing seals between a ceramic part and a metal part consisting in forming a hoop built up by one or more layers of particles deposited on one of the parts to be sealed to each other.

PATENTED JUN29 1971  3,589,751

CERAMIC-TO-METAL SEAL

The present invention relates to ceramic-to-metal seals and a method for performing the same.

During the manufacture of a seal between a ceramic part and a piece of metal, one of the difficulties encountered is the substantial difference existing generally between the expansion coefficients of these two types of material, which difference results in strains and stresses therein, causing cracks in the sealed parts.

Many proposals have already been made with a view to overcoming this difficulty. Some of them suggest the use of a collar or hoop which should be placed about the seal between the ceramic and the metal.

Thus, for example, it is known, in the case of a metal sleeve being sealed onto a cylindrical ceramic part, to mount, during the formation of the seal or even once for all, a collar or hoop which surrounds the sleeve and restricts the expansion thereof which is generally higher than that of the ceramic. Other hoops have of course been used whose shape matches that of the parts to be sealed together.

Such hoops have earnest drawbacks.

Actually, whatever the care taken in the manufacture of such hoops, they do not integrally adhere to the parts to be sealed as the temperature changes during the formation of the seal, due to differences, however small, between the expansion of the hoops and that of the parts on which the latter is mounted when cold. This adversely affects the action exerted by the hoop.

Also, under the action of the stresses appearing during the heating cycle, the hoop slides relative to the parts on which it has been placed, especially in the axial direction. Its effects in this direction become null and it is no rare occurrence that longitudinal cracks appear in the parts after sealing.

Also, it may occur that, for different reasons, hoops of the desired thickness, which is sometimes critical, cannot be obtained.

In other cases, the hoops of desired shape cannot be produced with certain metals, such as, for example, tungsten.

It is an object of the invention to provide a method for forming a hoop which avoids such drawbacks, the word hoop being used for designating an element which limits the natural thermal expansion of at least one of the parts to be sealed together.

According to the invention there is provided a method for reinforcing seals between a ceramic part and a metal part comprising the step of forming, prior to the operation of sealing, at least one layer of particles on one of said part, for exerting thereon a hooping action preventing the normal thermal expansion thereof.

The ceramic-to-metal seal according to the invention is obtained by directly depositing, in the form of particles, metal, ceramic or any other substances or compositions, compatible with known deposition techniques, on at least one of the parts to sealed together.

This deposit may effected in several separated stages, the same or different particles being used during each stage.

The thickness of the deposit is adjusted to obtain a minimum stress in the seal, at the moment of expansion.

The deposit of the hooping material is made by using any known method, such as projection by oxyhydrogen, oxyacetylene or plasma torch methods, pyrolysis at high or low temperature, etc.

The adhesion of particles to each other and to parts to be sealed may be improved by any suitable known technique, such as heating, adding a binder, etc.

For a better understanding of the invention and to show how the same may be carried into effect, reference will be made to the drawings accompanying the following description and in which.

Figure 1:
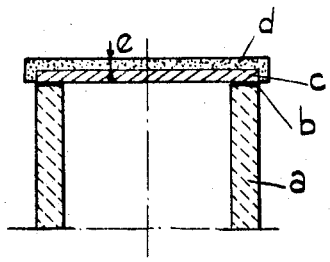
FIG. 1 shows a flat seal according to the invention.

In all the figures, $a$ and $c$ designate the parts to be sealed to each other, $b$ is the sealing material, $d$ the hoop used according to the invention, and $e$ the thickness of the latter.

According to the invention, the hoop $d$ is built up by one or more deposits, wherein the nature of the deposit is chosen to be compatible with the depositing method used.

In this manner, hooping structures are obtained which match perfectly the profile of the parts to be sealed together and keep them permanently in the same relative position. This point is of special importance during the critical phase of thermal treatment during which there is a risk of thermal stresses appearing in the seal. The hooping structure of the invention is effective in all the three directions, any displacement thereof in some privileged direction being made impossible. Moreover, the thickness of the hooping structure may be adjusted with optimal accuracy.

This thickness is determined by the following considerations: If $e_d$ is the thickness of the hoop, $E_d$ its modulus of elasticity, and $\delta_d$ its differential expansion relative to the part on which the hoop is not formed i.e. the part $a$ in the present instance, between ambient temperature and maximum temperature of the cycle, and $e_c$, $E_c$ and $\delta_c$ designating respectively the same characteristics of the part on which the hoop is positioned i.e. the part $c$ in the present instance, for the stresses appearing in the seal to be minimized, one must have the relation:

$$Ke_d E_d \delta_d = e_c E_c \delta_c, \quad (1)$$

where K is a coefficient between 1 and 2, which due to the fact that the material of the hoop is in the form of a deposit and not a worked element.

It can be seen from this formula that there are, for two given materials to be sealed to each other, i.e. with $E_c$ and $\delta_c$ given, several parameters which can be adjusted in order to obtain the condition (1). These parameters are $e_c$, $e_d$, $E_d$ and $\delta_d$.

According to the invention, it is particularly easy to act on these parameters: on $e_d$, or $(e_d/e_c)$, simply by changing the thickness of the deposit, i.e., the duration of the treatment; on $E_d$ and $\delta_d$ by selecting suitable deposit materials.

The drawing shows, by way of example, a few embodiments of the invention.

In FIG. 1 a disc $c$ is sealed on a tubular body $a$ by means of a sealing material $b$. The hoop element $d$ is in the form of a deposit $d$.

Figure 2:
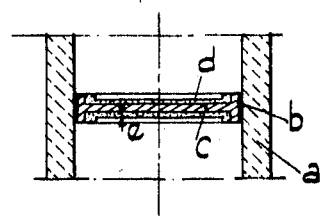
FIG. 2 is an example of a seal closing a tube.

In FIG. 2 a disc is sealed within a tube. The hoop element $d$ covers both faces of the disc.

Figure 3:
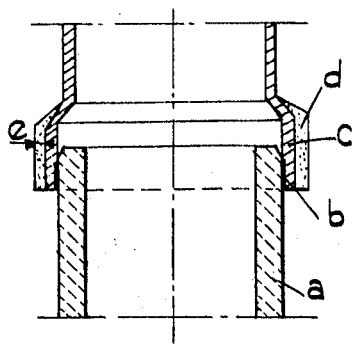
FIGS. 3 and 4 are two embodiments of seals on cylindrical parts.
Figure 4:
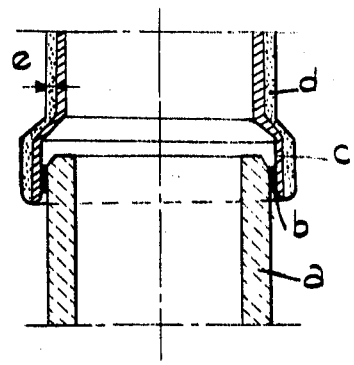
Figure 5:
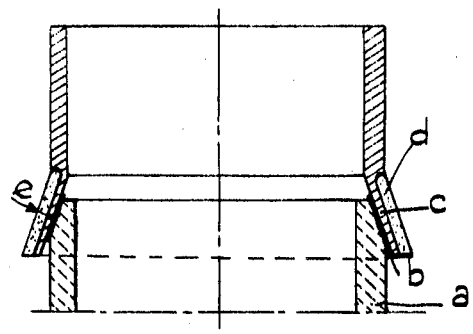
FIG. 5 is an embodiment of a seal between parts terminated as truncated cones.

FIGS. 3, 4 and 5 show other embodiments of the invention. They relate to two tubular elements being sealed together. In these embodiments tube $c$ has a flared end and tube $a$ has a tapered end. The tapering is the same in FIGS. 3 and 4 and in these figures the tapered end of tube $a$ does not contact $b$, the sealing material $b$ being interposed between a portion of flared end of tube $c$ and a nontapered portion of the wall of tube $a$. The hooping element $d$ covers the flared part of the tube $c$ in FIG. 3 and extends beyond it in FIG. 4.

In FIG. 5, the sealing material $b$ is interposed between the tapered end of tube $a$ and the flared end of tube $c$, which end is covered by the hooping member $d$. The latter is flush with the outer surface of tube $c$.

In embodiments according to FIGS. 4 and 5 the following materials and numerical values were used:

Example of FIG. 4:

Part $a$: alumina tube with an inner diameter equal to 16 mm. and an outer diameter equal to 20 mm.

Part $d$: tube of 0.2mm. thickness of an alloy known as Inconel with, for example, 72 percent Ni, 16 percent Cr, 8 percent Fe and 4 percent of other known components.

Part $d$: deposit of tungsten of 0.3mm. thickness.

The tungsten was deposited from the vapor phase at 550° C. from $WF_6$.

Example of FIG. 5:

Part $a$: 99 percent alumina tube, 100 mm. diameter and 0.2mm. thickness, tapered at 15° over about 5 mm.

Part c: tube of the same composition as in the preceding example, 0.2mm. thickness, flared at 15° over a distance of about 10 mm.

Part d: tungsten deposit, thickness 0.4 mm., height about 10 mm.

The tungsten deposit is applied after degreasing and sandblasting the part c, by projection with a plasma torch.

Of course, the invention is not limited to the embodiments described and shown which were given solely by way of example.

What I claim is:

1. A method for reinforcing seals between a ceramic part and a metal part comprising the step of forming, prior to the operation of sealing, at least one layer of particles adhering to each other and to at least one of the said parts, for exerting a hooping action which prevents the normal thermal expansion thereof in both the longitudinal and circumferential directions.

2. A method as claimed in claim 1, wherein said particles are metal particles.

3. A method as claimed in claim 1, wherein said particles are ceramic particles.

4. A method as claimed in claim 1, wherein said particles are deposited by means of a torch.

5. A method as claimed in claim 1, wherein there are a plurality of said layers, the particles forming at least two of said layers being of different natures.

6. An assembly of a ceramic part and a metal part sealed to each other comprising a hooping element on one of said parts, said hooping element comprising at least one layer of particles preventing the normal thermal expansion of said one part said particles adhering to each other and to said part.